Figure 1:
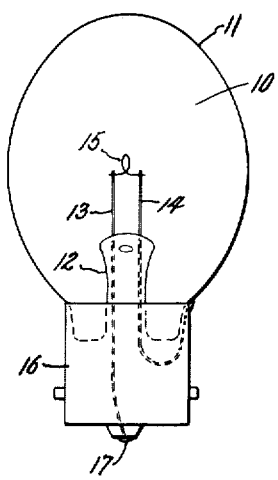

United States Patent Office 2,791,897
Patented May 14, 1957

2,791,897

PHOTOFLASH LAMP

Walter Roth, Schenectady, N. Y., assignor to General Electric Company, a corporation of New York Application December 13, 1955, Serial No. 552,837

9 Claims. (Cl. 67—87)

The present invention relates to photoflash lamps containing a combustible material which is adapted to produce a momentary flash of actinic light when ignited. More particularly, the invention is directed to photoflash lamps of the type in which actinic light is produced by the combustion reaction of a mixture of gases.

It has been known for some time that when a gaseous mixture of carbon disulfide and oxides of nitrogen is ignited, there results a brilliant and momentary flash of actinic light. A serious detriment to the use of photoflash lamps utilizing the above-mentioned light producing reaction arises, however, because of the fact that bulbs so produced have poor shelf life. Thus, photoflash lamps containing gaseous mixtures of carbon disulfide and nitrogen oxides have heretofore been unsatisfactory because a delay of even several days between manufacture and use is sufficient to render such bulbs inoperative.

Accordingly, one object of the present invention is to produce an improved gaseous mixture photoflash lamp having long shelf life.

A further object of the invention is to produce a useful photoflash lamp in which actinic light is produced by the explosive reaction of a mixture of gases.

Still another object of the invention is to produce a photoflash lamp having long shelf life, which lamp utilizes the explosive combustion reaction between carbon disulfide and the oxides of nitrogen.

In accord with one aspect of my invention I provide photoflash lamps having an evacuable envelope which is filled with an atmosphere of carbon disulfide gas. The filament or igniting electrode of the lamps of my invention are coated with a solid material containing nitrogen and oxygen. When the filament or igniting electrode is heated to incandescence by the passage of electricity therethrough, volatile nitrogen oxides are released from the solid material thereon. The incandescence of the filament, or the spark or arc produced by the fracture thereof, causes an explosive combustion between the nitrogen oxides and the carbon disulfide, producing a momentary flash of actinic light.

The novel features believed characteristic of the invention are set forth in the appended claims. The invention itself, however, together with further objects and advantages thereof, may best be understood with reference to the following description taken in connection with the drawing in which Figure 1 represents a photoflash lamp constructed in accord with the invention, and Figure 2 illustrates one method in which the filaments of the photoflash lamps of the invention may be coated.

While it has been known previously that the explosive reaction between oxides of nitrogen and carbon disulfide, and particularly, between nitric oxide (NO) and carbon disulfide are quite well suited for the production of actinic light in photoflash work, it has not heretofore been possible to make commercially satisfactory photoflash lamps which utilize this reaction. As mentioned hereinbefore, this is primarily due to the fact that bulbs filled with a mixture of carbon disulfide and an oxide of nitrogen, particularly those containing nitric oxide, undergo a reaction which causes the bulb to be inoperative after a very short period of time.

I have found that while some deterioration in shelf life of this type of photoflash bulb may be due to a slow reaction between the constituent gases, the greatest cause for failure is due to a deterioration of the bulb filaments and lead wires. This deterioration is believed to be due to the formation of nitric acid by the oxidation and hydrolysis of nitric oxide due to the presence of small amounts of oxygen and water vapor within the bulbs. While this oxidation and hydrolysis might be avoided by a carefully controlled operation in filling the lamp with its constituent gases in order to preclude the presence of water vapor and oxygen therein, such careful control is difficult to maintain in commercial production of photoflash lamps. In accord with my invention I provide photoflash lamps having a filament coated with thermally decomposable solid material containing nitrogen and oxygen. In these photoflash lamps nitrogen oxides are not released until current passes through the bulb filament, thus precluding the formation of nitric acid.

Figure 2:
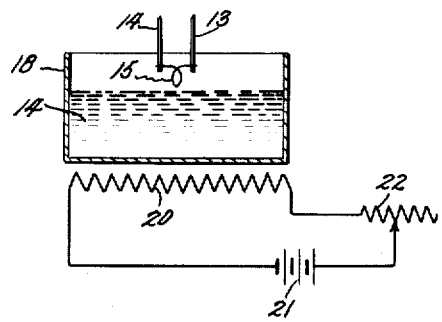

In Figure 1 of the drawing there is shown a photoflash bulb 10 constructed in accord with my invention. Photoflash bulb 10 includes an evacuable envelope 11 which may be of glass, quartz, or other transparent refractory material, having a reentrant portion 12 through which filament conductors 13 and 14 enter bulb 10. Lamp filament 15 is disposed in the approximate center of bulb 10 between lead wires 13 and 14 and may be in the form of a single filament, a filament having a loop therein, or a filament in the form of a helix. Filament conductor 14 is electrically connected to base member 16 and filament conductor 13 is electrically connected to base center terminal 17 electrically insulated from base 16. Electrical energy for causing the ignition of the combustible material within bulb 10 is supplied between base member 16 and base cap 17. Filament conductors 13 and 14 may be constructed of any high conductivity metal and are preferably made of copper or copper alloys. Filament 15 is made of a high melting point, high resistance metal as, for instance, tungsten. In order that filament 15 may become incandescent and fracture in a very short time, thus igniting the gases within bulb 10, wire 15 is preferably less than one one-thousandth inch in diameter.

In the practice of the invention, filament 15 is coated with a solid material containing nitrogen and oxygen. Inorganic nitrogen and oxygen containing salts are preferred. Materials which may suitably comprise the coating upon filament 15 include the alkali metal nitrates and nitrites and the alkaline earth nitrates and nitrites. Other materials which are suitable for use as coatings for filament 15 are ammonium nitrate $NH_4NO_3$, mercuric nitrate $Hg(NO_3)_2$ and cupric nitrate $Cu(NO_3)_2$. The amount of nitrogen and oxygen containing material which coats filament 15 is not critical. Amounts as small as a few milligrams of a nitrogen and oxygen containing material are sufficient. Greater amounts often may be used but additional amounts neither further enhance the actinic light produced by the bulbs of the invention nor decrease the amount produced thereby. The criterion of the amount of solid oxygen and nitrogen containing material upon the filament of the bulbs of the invention is relatively easily met. Enough of this material must be present to liberate, upon thermal decomposition, sufficient nitrogen oxides so that the volumetric ratio of the total of all nitrogen oxides to the carbon disulfide present, is approximately from 2 to 1 to 4 to 1. Obviously this amount will vary, depending upon the volume of the bulb, the pressure of carbon disulfide present therein, and the molecular weight of the solid material utilized.

The solid material coating for filament 15 may be provided in a number of ways. I have found, however, that dipping filament 15 into a bath of fused salts from 1 to 5 times produces an excellent coating which releases sufficient nitrogen oxides in the bulbs of the invention to produce a high intensity flash of actinic light when the bulbs are ignited.

In Figure 2 of the drawing there is shown schematically one method for the production of the coated filaments of the invention. In Figure 2, filament 15 is disposed above a container 18 containing a quantity of a fused inorganic salt 19. Salt 19 is maintained in the fused state by means of a heater wire 20 disposed beneath container 18. Electric current is passed through heater wire 20 from a source of potential which may be unidirectional or alternating but is represented generally as battery 21. Proper control of the current through heater 20 is maintained by means of a variable resistance 22. In producing the coated filaments utilized in the photoflash lamps of the invention filament 15 is dipped into fused inorganic salt 19 and removed and allowed to cool for several seconds to solidify the coating thereon. The dipping and coating process is repeated from 1 to 5 times at which time a thin coating of the order of 1 millimeter in diameter, weighing from 10 to 100 milligrams is formed upon filament 15. Filament 15 may then be incorporated into a photoflash bulb as represented in Figure 1 of the drawing. The bulb is then filled with an atmosphere of carbon disulfide which may vary in pressure from approximately 3 to 25 centimeters of mercury.

In one specific example of the photoflash lamps of the invention, a glass enclosed bulb having a volume of 25 cubic centimeters was filled with carbon disulfide gas at a pressure of 10 centimeters of mercury. The filament of this bulb was a straight filament of tungsten 0.002 millimeter in diameter and 5 millimeters long, and had a coating thereof of ammonium nitrate $NH_4NO_3$. The ammonium nitrate formed a cylinder 2 millimeters in diameter and weighed 30 milligrams.

When the bulbs of the invention are flashed by a pulse of electric energy transmitted to base 16 and base terminal 17, filament 15 first becomes incandescent causing the thermal decomposition of the solid material coated thereon. As the solid material decomposes, nitric and nitrous oxides and nitrogen dioxide are evolved therefrom. After a short period of time which may, for example, be one tenth of a second filament 15 reaches a temperature sufficiently high to cause the rupture thereof, and a spark is generated which ignites the mixture of the nitrogen oxides with the carbon disulfide, producing a momentary flash of actinic light. Since nitrogen oxides are not initially present in the gaseous state, no oxidation and hydrolysis thereof and, consequently, no formation of nitric acid takes place. Additionally, since the oxides of nitrogen are not initially present in the gaseous state, no slow reaction occurs between these oxides and the carbon disulfide within the bulbs of the invention. Since neither the formation of nitric acid nor slow gaseous reactions may occur in the bulbs of this invention long shelf life is obtained and the bulbs do not deteriorate if not used immediately.

While my invention has been described with respect to a particular embodiment thereof, it is obvious that many modifications may be made by those skilled in the art without departing from the invention. I intend, therefore, by the appended claims, to cover all such modifications as fall within the true spirit and scope of the invention.

What I claim as new and desire to secure by Letters Patent of the United States is:

1. A photoflash lamp comprising an evacuable transparent envelope, an electrically conductive filament within said envelope, a coating upon said filament of a solid material containing nitrogen and oxygen, said material being productive of a gaseous oxide of nitrogen upon thermal decomposition thereof, and a charge of carbon disulfide within said envelope.

2. A photoflash lamp comprising an evacuable transparent envelope, an electrically conductive filament within said envelope, a coating upon said filament of an inorganic salt containing nitrogen and oxygen, said material being productive of a gaseous oxide of nitrogen upon thermal decomposition thereof, and a charge of carbon disulfide within said envelope.

3. A photoflash lamp comprising an evacuable transparent envelope, an electrically conductive filament within said envelope, a coating upon said filament of a solid material selected from the group consisting of the alkali nitrates, the alkali nitrites, the alkaline earth nitrates, the alkaline earth nitrites, ammonium nitrate, mercuric nitrate and copper nitrate, and a charge of carbon disulfide within said envelope.

4. The device of claim 3 in which the filament coating is ammonium nitrate.

5. The device of claim 3 in which the filament coating is mercuric nitrate.

6. The device of claim 3 in which the filament coating is cupric nitrate.

7. The device of claim 3 in which the filament coating is sodium nitrate.

8. A photoflash lamp comprising an evacuable transparent envelope, an electrically conductive filament within said envelope, a coating upon said filament of a solid material containing nitrogen and oxygen, said material being productive of a gaseous oxide of nitrogen upon thermal decomposition thereof, and an atmosphere of carbon disulfide at a pressure from 3 to 25 centimeters of mercury within said envelope.

9. A photoflash lamp comprising an evacuable transparent envelope, an electrically conductive filament within said envelope, a coating upon said filament of a solid material selected from the group consisting of the alkali nitrates, the alkali nitrites, the alkaline earth nitrates, the alkaline earth nitrites, ammonium nitrate, mercuric nitrate and copper nitrate, and an atmosphere of carbon disulfide at a pressure from 3 to 25 centimeters of mercury within said envelope.

References Cited in the file of this patent

UNITED STATES PATENTS

| 1,989,572 | Van Liempt et al. | Jan. 29, 1935 |
| 2,013,371 | Van Liempt et al. | Sept. 3, 1935 |